(12) United States Patent
Schaefer et al.

(10) Patent No.: US 7,627,762 B2
(45) Date of Patent: Dec. 1, 2009

(54) SIGNING AND AUTHENTICATION DEVICES AND PROCESSES AND CORRESPONDING PRODUCTS, NOTABLY FOR DVB/MPEG MHP DIGITAL STREAMS

(75) Inventors: Ralf Schaefer, Acigne (FR); Alain Durand, Rennes (FR); Laurent Lesenne, Acigne (FR); Frédéric Pasquier, Laille (FR)

(73) Assignee: Thomson Licensing, Boulogne-Billancourt (FR)

( * ) Notice: Subject to any disclaimer, the term of this patent is extended or adjusted under 35 U.S.C. 154(b) by 688 days.

(21) Appl. No.: 10/514,796

(22) PCT Filed: Nov. 8, 2002

(86) PCT No.: PCT/EP02/14897

§ 371 (c)(1),
(2), (4) Date: Nov. 18, 2004

(87) PCT Pub. No.: WO03/098895

PCT Pub. Date: Nov. 27, 2003

(65) Prior Publication Data

US 2005/0257059 A1 Nov. 17, 2005

(30) Foreign Application Priority Data

May 22, 2002 (EP) .................. PCT/EP02/05610

(51) Int. Cl.
*H04L 9/00* (2006.01)
*G06F 21/24* (2006.01)

(52) U.S. Cl. .................. 713/176; 380/210; 380/212

(58) Field of Classification Search .................. 380/212
See application file for complete search history.

(56) References Cited

U.S. PATENT DOCUMENTS

| 6,009,176 | A  | * | 12/1999 | Gennaro et al. ............. 713/170 |
| 6,081,600 | A  | * | 6/2000  | Blanchard et al. ........... 380/255 |
| 6,314,518 | B1 | * | 11/2001 | Linnartz ..................... 713/176 |
| 7,075,919 | B1 | * | 7/2006  | Wendt et al. ................ 370/352 |
| 7,305,697 | B2 | * | 12/2007 | Alao et al. .................. 725/114 |
| 2003/0009769 | A1 | * | 1/2003 | Hensgen et al. ............. 725/131 |
| 2004/0139480 | A1 | * | 7/2004 | Delpuch et al. ............. 725/135 |
| 2004/0162980 | A1 | * | 8/2004 | Lesenne et al. ............. 713/153 |

FOREIGN PATENT DOCUMENTS

| EP | 0752786    | 1/1997  |
| WO | WO 98/43431 | 10/1998 |
| WO | WO 99/49614 | 9/1999  |
| WO | WO 99/62248 | 12/1999 |

OTHER PUBLICATIONS

Sedlmeyer: "Multimedia Home Platform-Standard 1.0.1", Femseh Und Kinotechnik, VDE Verlag GmbH, Berlin, De, vol. 55, No. 10, Oct. 2001, pp. 593-597.
Searc Report Dated May 23, 2003.

* cited by examiner

*Primary Examiner*—Matthew B Smithers
(74) *Attorney, Agent, or Firm*—Robert D. Shedd; Robert B. Levy (57) ABSTRACT

The present invention concerns a device and a process for signing digital streams, each of them comprising contents, related to audiovisual information, and a signaling. The device applies encrypting to selectively determined descriptors of the signaling, called authenticated descriptors, to obtain signature. The invention also concerns corresponding authentication device and process. Application to authentication of DVB/MPEG digital streams, notably for MHP.

18 Claims, 3 Drawing Sheets

SIGNING AND AUTHENTICATION DEVICES AND PROCESSES AND CORRESPONDING PRODUCTS, NOTABLY FOR DVB/MPEG MHP DIGITAL STREAMS

This application claims the benefit, under 35 U.S.C. § 365 of International Application PCT/EP02/14897, filed Nov. 8, 2002, which was published in accordance with PCT Article 21(2) on Nov. 27, 2003 in English and which claims the benefit of International Procedure patent application No. EP02/05610, filed May 22, 2002.

FIELD OF THE INVENTION

The present invention relates to signing and authentication devices and processes, and to associated products, notably for DVB (Digital Video Broadcasting)/MPEG (Moving Picture Experts Group) digital streams and in particular for MHP (Multimedia Home Platform) standard.

BACKGROUND OF THE INVENTION

It thus relates notably to the field of digital television. The digital television environment includes the broadcast or streaming of different sorts of data like audiovisual contents (typically MPEG audio/video), interactive contents, triggers, Program Specific Information (specific information about the sent programs, in brief "PSI"), Service Information (complementary information enabling a receiver to automatically configure and a user to browse in the services by means of an EPG—Electronic Program Guide, in brief "SI"), Private Data, Signaling and so on. The information related to origins, destinations and structuring of the contents (namely PSI, SI, and some private data) are usually integrated in the signaling.

These various data are usually distributed over MPEG-2 transport streams, which consist of audiovisual streams transported in PES (Packetized Elementary Streams) and of other information (signaling, PSI, SI, interactive content . . . ) transported in MPEG-2 sections. Some digital broadcast networks and broadband networks are more or less vulnerable to spoofing. Technically well equipped pirates can intercept data, modify them and rebroadcast (or re-stream) those data in the network. Terrestrial and microwave broadcast networks are more vulnerable than satellite or cable networks. The problem is thus to securitize digital data transmission over MPEG-2 networks.

In fact, some data items listed like audiovisual content, PSI and SI are pure broadcast content, so that their piracy is annoying for the user, but at least has not a financial impact for him. However interactive terminals with a return channel can run t-commerce (television commerce) or home banking applications. Spoofing of such applications is then not only very annoying for the user, but can also cost him a lot of money.

The authentication of data contents is already well known. Notably, document WO-99/49614 describes a method of authentication of data sent in a digital stream, in which the data are organized into a hierarchy of at least one root directory unit, subdirectory unit and file unit. The data in a file are signed and an associated file authentication value is stored in the referring subdirectory unit. This file authentication value is in turn signed and an associated subdirectory authentication value is stored in the referring root directory. Other aspects of this disclosure relate to the authentication of a second root directory by generation of a second authentication value, and to the authentication of data before encapsulation in tables or sections of a transport stream.

Also, document WO-99/62248 discloses a method implemented in an interactive television system, for managing modules of interactive television applications. This system transmits modules from a broadcast station to a plurality of receiving stations, and the receiving stations have module managers that store module requests and monitor the various channels for modules corresponding to the requests. In detailed embodiments, an application to be transmitted consists of a series of modules, one of which is a directory module. The latter contains an entry for each of the modules in the application, and enough information to allow the receiving stations to access all the modules of the application. Further, an authentication mechanism may be applied in the receiving stations for ensuring that the currently downloaded carousels and/or modules are authentic.

Further interactive systems like the DVB Multimedia Home Platform specify how to authenticate broadcast applications and they specify how to protect data contents that are transferred over a return channel. However, fraudulent operations still remain possible, since it is possible to alter the signaling in an appropriate way so as to cancel, replace or add contents without any apparent discrepancy. It would then be tempting to provide for an authentication not only of the contents, but also of the signaling itself, as is done notably for streams built according to the ATVEF (for Advanced Television Enhancement Forum) standard.

However, such a method causes specific difficulties for DVB digital streams, because streams are commonly re-multiplexed in network head-ends. Then, PIDs (Packet IDentifiers) or even the contents of tables like PMTs (for Program Map Tables, one table per program indicating the PIDs of the PES constituting that program, possibly in addition to private information related to that program) risk to be modified due to network requirements. This would mean calculating again all hash codes and signatures, what would involve giving to each multiplexer a private key to compute an appropriate signature. Now, the cost for providing each multiplexer with a certified key pair would be huge. That situation has discouraged skilled persons to develop such a signaling authentication strategy.

SUMMARY OF THE INVENTION

The present invention is related to a device for signing digital streams intended to be transmitted via a communication network, adapted to DVB digital streams authentication, notably for MHP applications, and making communications much safer.

It concerns also a corresponding process, as well as a device, and an associated decoder, and a process for authenticating digital streams received via a communication network, and corresponding software and digital stream.

Accordingly, the invention applies to a device for signing digital streams intended to be transmitted via a communication network, by producing at least one signature to be incorporated in the digital streams, obtained from encrypting applied to the digital streams. Each of those digital streams comprises several information entities, those entities including:

contents, related to at least audiovisual information, and at least one signaling, made of an information set related to origins, destinations and structuring of the contents, that signaling being liable to be modified in networks due to network requirements, containing essential data structures called descriptors, and being built mainly by means of arranged groupings called tables.

According to the invention, the signing device is intended to apply the encrypting to at least the signaling, and more specifically to selectively determined descriptors among the descriptors of that signaling, called authenticated descriptors.

So, by contrast with what would have been the natural solution if signaling had been signed, namely to apply authentication process to complete sections (which are sub-tables of the signaling, having a limited size), specific descriptors of the signaling are chosen for authentication. A direct advantage of that surprising solution is that it becomes possible for signing, to choose descriptors which remain untouched by the re-multiplexing steps. Thus, protection against malicious modifications can be very efficiently put in practice, while avoiding heavy complications in the authentication process, due to re-multiplexing in network head-ends.

Also, even when it is decided for signing to keep some descriptors which are intended to be modified during re-multiplexing, it can be lighter and faster than if the complete sections had to be signed again, to provide generating updated signatures taking into account the modified descriptors, in re-multiplexing equipments. Indeed, with a judicious choice of the modified descriptors, most information obtained at the emission level for signing can possibly be kept, notably in the form of unchanged digest values resulting from hashing, and only minor part of the signing information has to be re-computed for signing.

By "audiovisual information", it is meant audio and/or visual information.

Preferably, the digital streams are built according to DVB and MPEG standards, and more specifically, according to MHP standard.

The signing device of the invention can be applied to the authentication of any MPEG/DVB table, like notably for PSI tables: PMT, PAT (Program Access Table, indicating for each sent program, the link between the number of the program and the PIDs of the PMT transport packets), CAT (Conditional Access Table, giving the PIDs of the PES carrying Entitlement Management Messages—EMM, in case of at least one program having a conditional access), and for DVB-SI tables: NIT (Network Information Table), SDT (Service Description Table), EIT (Event Information Table), TOT (Time Offset Table), AIT (Application Information Table), BAT (Bouquet Association Table). The signing device can also be applied to any MPEG/DVB private table based on the MPEG2 system (ISO/IEC 13818-1) section syntax.

The signing device advantageously comprises means for enabling a user to select the authenticated descriptors. That user is for example a member of a broadcasting team. Then, either the identities of the chosen descriptors are incorporated into the streams, so that the receivers are informed of the used descriptors as they receive those streams, or they are beforehand agreed between the emitter and the receivers. Another solution is that the chosen descriptors are determined more systematically, for example in a specific standard version.

Preferably, the signing device is intended:
  to introduce the signature in at least one lowest level signature descriptor in the digital streams,
  and to further incorporate in the digital streams at least one certification descriptor including certification data on that signature,
  and at least one higher level signature descriptor resulting from applying encrypting to both contents of the lowest level signature descriptor and the certification descriptor.

This is very interesting for safely and flexibly assuring interoperability between various participants, like broadcasters and manufacturers.

In practice, this can result in a Public Key Infrastructure (PKI), as soon as several levels are provided. Then, a root certification authority is established (for the highest level signature), as well as optionally other certification authorities.

Preferably, the signing device comprises means for incorporating into the digital streams, addresses of the authenticated descriptors. This is an efficient way to make the receivers aware of the used descriptors for signing.

It is then advantageous that the incorporating means are intended to introduce at least one hash descriptor in each of the digital streams. The hash descriptor comprises at least one digest value resulting from the application of a hash algorithm to at least one of the authenticated descriptors and which is used for computing the signature. The hash descriptor comprises also the addresses of the authenticated descriptors used for computing that digest value. Such an achievement improves the authentication efficiency, because it relies on transmitting intermediary results for computing the signature, and thus for checking its authenticity.

More specifically, the incorporating means are preferably intended to arrange the hash descriptors in the digital streams according to a tree structure, at least one of the hash descriptors being computed from at least one other of the hash descriptors having a lower level. That nested computation of the digest values enables to progressively compute the basic value from which the signature is finally obtained (namely, the root digest value), while ensuring taking into account all required information on the various authenticated descriptors.

The digest values have preferably a fixed size, as is usually done in the existing hash algorithms.

Also preferred are the following embodiments with incorporating means, each table comprising at least one section having a limited size and being allocated a number, and each section comprising at least one loop successively introducing descriptors in that section. Those incorporating means are advantageously intended to specify the address of each of the authenticated descriptors belonging to at least one given loop of a given section and having at least one occurrence number respectively for each of those loops, by mentioning at least:
  that section number
  and those occurrence numbers.

In that way, it is possible to identify efficiently and in a simple way the identities of the used descriptors for authentication.

Other possibly transmitted information for addressing includes:
  the version number of that section,
  and/or the type of that section.

In a special achievement with the incorporating means, the signing device is advantageously intended to introduce the signature, and possibly at least one of the digest values and of the certification data, in the form of private data into at least one specific section, such specific section being linked to the sections containing the authenticated descriptors. That achievement allows to dissociate at least some of the authentication information from the other signaling data.

Thus, in a preferred embodiment, the specific section is intended to contain the signature(s) and certificate data, advantageously in the form of signature and certificate descriptors, as well as a root hash descriptor giving the root digest value and pointing to lower level digest values in other sections. This can be very advantageous, because the structure of DVB/MPEG-2 does not allow to place descriptors at the beginning of a section, which are valid for the whole rest of the section. Namely, all descriptors are somewhere in loops, which is the reason why top level descriptors cannot be sent directly with the section.

In another embodiment with the specific section, not only the signature(s) and certificate data and the root hash descriptor are placed in the specific section, but also all other hash descriptors (for example at the top level of that section). This is possible with DVB/MPEG-2, since the addressing mechanism allows to address descriptors in tables directly.

The invention also concerns a process corresponding to the device above, preferably intended to be executed by means of any embodiment of the signing device according to the invention.

Another object of the invention is a device for authenticating digital streams received via a communication network by checking at least one signature incorporated in the digital streams. Each of those digital streams comprises several information entities, which include:

contents, related to at least audiovisual information, and at least one signaling, made of an information set related to origins, destinations and structuring of the contents, that signaling being liable to be modified in networks due to network requirements, containing essential data structures called descriptors, and being built mainly by means of arranged groupings called tables.

According to the invention, the authentication device is intended to apply authentication to at least that signaling, and more specifically to selectively determined descriptors among the descriptors of that signaling, called authenticated descriptors, from which the signature is computed.

The authentication device is preferably intended to be applied to digital streams comprising signatures produced by a signing device according to the invention.

The invention is also related to a decoder, characterized in that it comprises an authentication device according to the invention.

Another object of the invention is an authentication process corresponding to the authentication device of the invention, preferably intended to be executed by means of any embodiment of the latter.

The invention concerns also a computer program product comprising program code instructions for executing the steps of the signing or the authentication process of the invention when that program is executed on a computer.

The terms "computer program product" should be understood as embracing any materialization of a computer program, which could be directed not only to storing supports (cassettes, disks . . . ), but also signals (electrical, optical . . . ).

The invention further applies to a digital stream comprising several information entities, those entities including:

contents, related to at least audiovisual information, and at least one signaling, made of an information set related to origins, destinations and structuring of those contents, that signaling being liable to be modified in networks due to network requirements, containing essential data structures called descriptors, and being built mainly by means of arranged groupings called tables, at least one signature being incorporated in the digital stream.

According to the invention, that signature is computed from the signaling, and more specifically from selectively determined descriptors among the descriptors of the signaling, called authenticated descriptors.

That digital stream is preferably produced by any of the embodiments of claimed signing device.

BRIEF DESCRIPTION OF THE DRAWINGS

The invention will be better understood and illustrated by means of the following embodiments, in no way limitative, with reference to the appended figures on which.

DETAILED DESCRIPTION OF PREFERRED EMBODIMENTS

Figure 1:
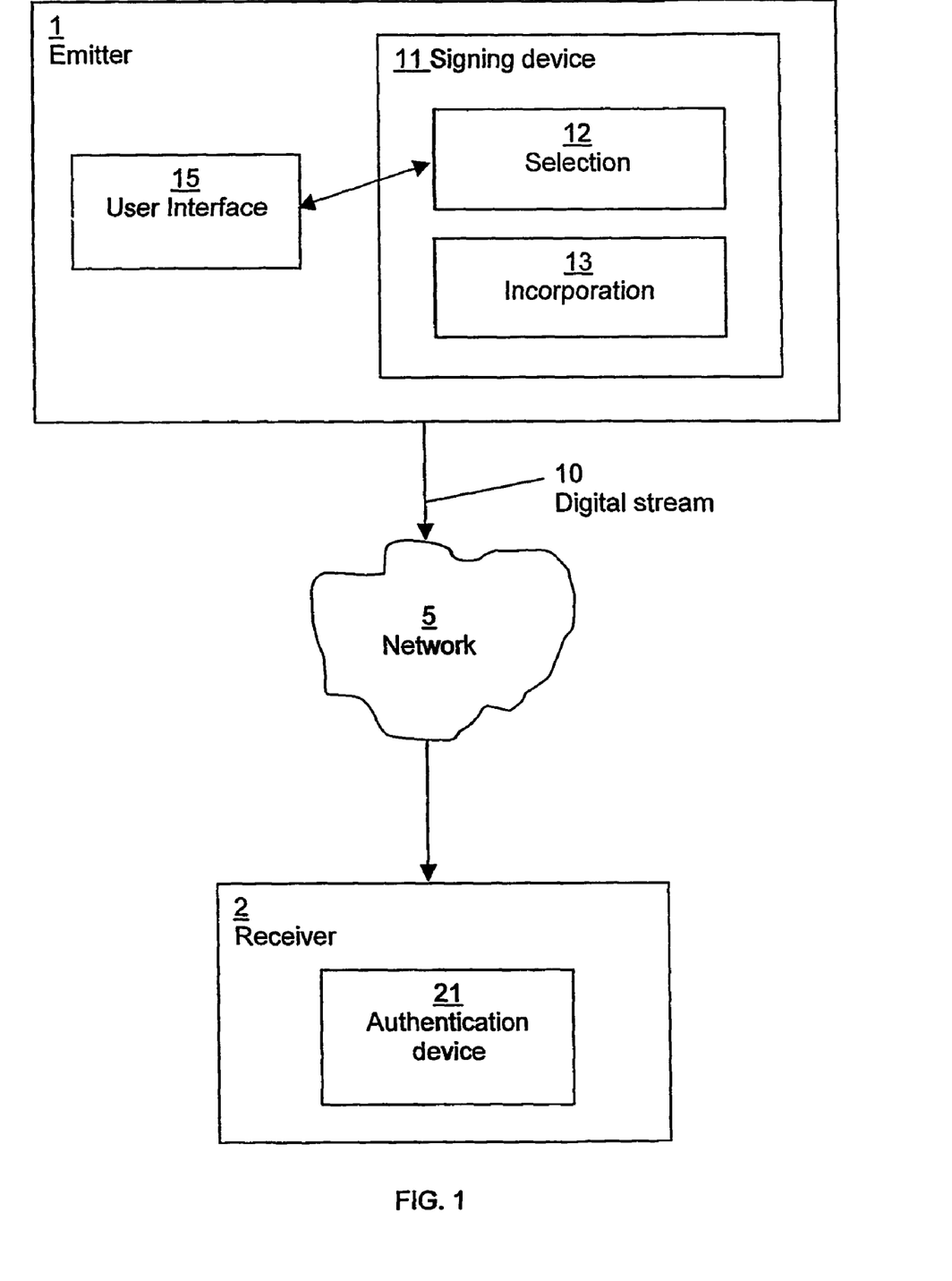
FIG. 1 is a diagrammatic representation of a signing device and a corresponding authentication device according to the invention.

An emitter 1 of digital streams 10 sends those streams 10 via a network 5 to receivers 2, which include decoding capacities (FIG. 1). The emitter 1 is typically intended to broadcast the streams 10, the network 5 being for example a broadband or broadcast network, as notably a cabled or satellite network. In another embodiment, the network 5 consists in Internet. In the illustration case, the digital streams 10 are constituted by DVB/MPEG-2 streams, which thus include notably contents and signaling data related thereto. The signaling is built mainly by means of tables and contains descriptors. The streams 10 can rely on the MHP standard.

The emitter 1 comprises a signing device 11 to sign the digital streams 10 to be sent, and a user interface 15 which notably enables the sender, for example a broadcaster, to control the signing process. The signing device 11 is intended to sign the signaling, and not only the contents. It contains a selection module 12 for a user to select via the user interface 15 some of the descriptors of the signaling, called authenticated descriptors, which are to be used for signaling authentication. Thus, encrypting is applied to them to obtain the concerned signature(s). The signing device 11 also contains an incorporating module 13, able to incorporate in the sent digital streams 10, addresses of the authenticated descriptors.

Each of the receivers 2, as for them, comprises an authentication device 21 able to check the signatures received, and notably the ones for signaling authentication. The authentication device 21 is able to take into account the authenticated descriptors indicated in the streams. 10 for authentication.

Figure 2:
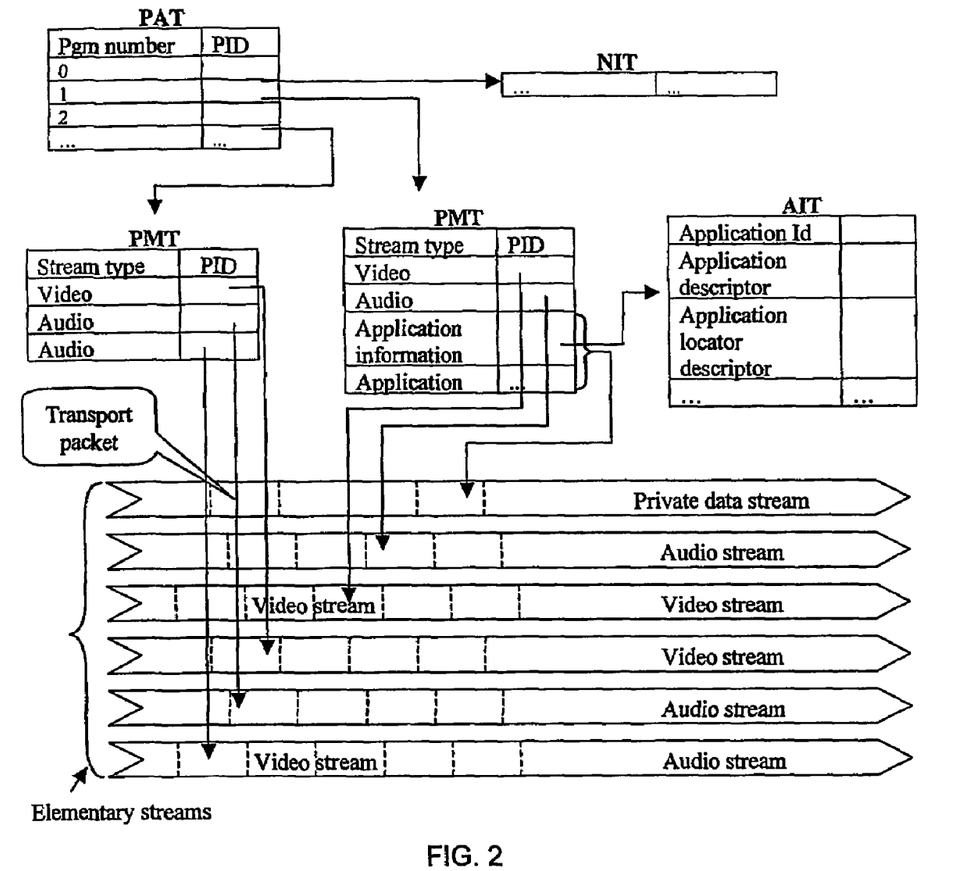
FIG. 2 shows DVB/MPEG-2 elementary streams, including audiovisual and private data streams, and associated tables (PAT, PMT and AIT), and points out the links between the tables and the streams.
Figure 3:
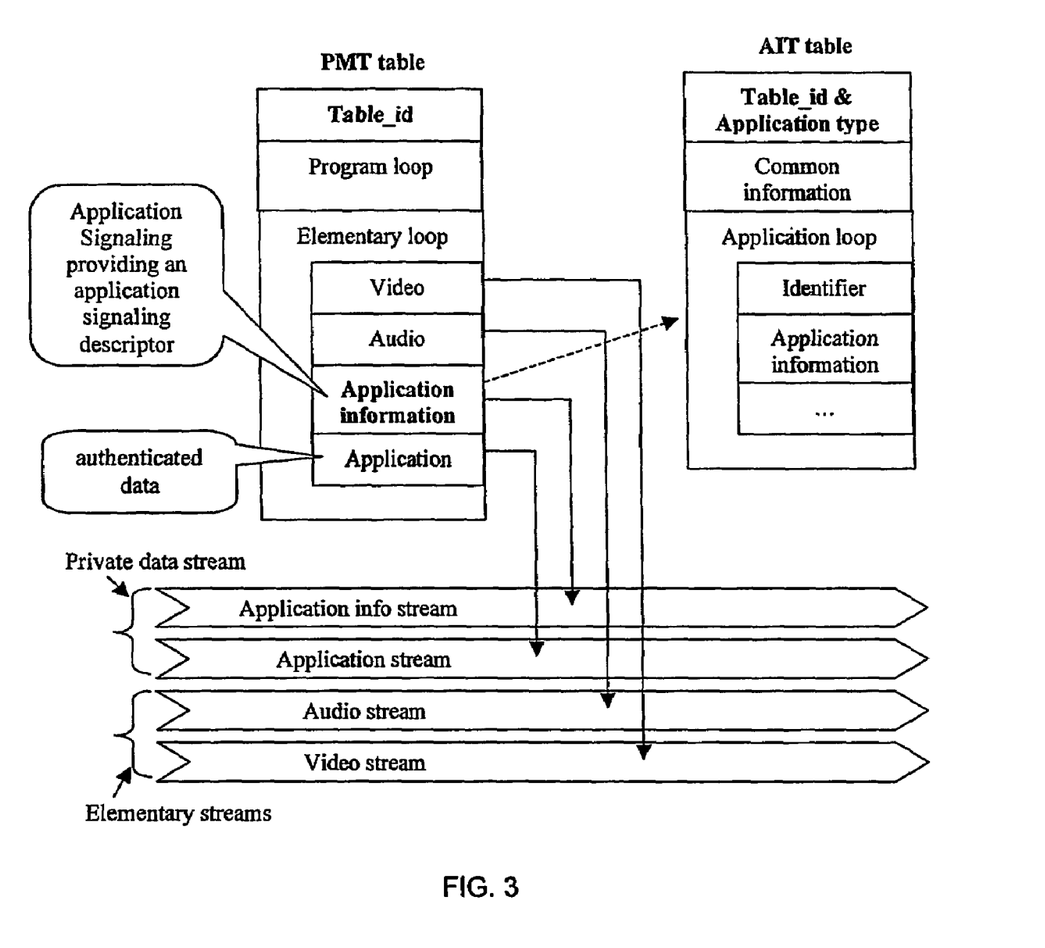
FIG. 3 details some of the tables (PMT and AIT) of FIG. 2, in relation to the elementary streams and to application information and application streams.

Particularly interesting examples will now be described. An important entry point for signaling a digital television service (interactive or not) is the PMT (Program Map Table) which is specified in the MPEG-2 system standard (ISO/IEC 13818-1). In the case of signaling of interactive MHP applications, the PMT contains the location of the stream transporting the AIT (Application Information Table) and the location of the stream transporting the application code and data (pointer to the DSM-CC DSI message, DSM-CC designating the Digital Storage Media—Command & Control standard, and DSI standing for "DownloadServerInitiate", ISO/IEC 13818-6 International Standard), as illustrated in FIGS. 2 and 3. The technical achievements below enable to protect the signaling data for interactive MHP applications, so that a decoding platform can check if it has not been modified over the transport network. Moreover, the MPEG-2 systems standard prohibits the scrambling of the PMT, so that no scrambling is considered here.

The protection of signaling is based on hash codes, signatures and certificates. The coding of these cryptographic messages is done by the specification of three new descriptors, which contain respectively the objects above:

hash_descriptor signature_descriptor certificate_descriptor.

The hash_descriptor fields are here introduced independently for each section to be individually authenticated, and we consider below such a given section of a table, whether the latter is formed of several sections or only one section. On the other hand, the signature_descriptor fields apply to all the hash_descriptor fields in a table and the certificate_descriptor fields concern all signature_descriptor fields in that table.

Specification of the Hash_Descriptor:

The hash_descriptor can be placed in loops of the AIT or of the PMT (or any other MPEG-2 table to be authenticated). More specifically, it is located in each descriptor loop that contains descriptors to be authenticated. The position in the loop doesn't matter, since the hash_descriptor includes a descriptor_address field which is able to address uniquely each descriptor.

The hash_descriptor contains a hash code, also called digest value, which is calculated over the descriptors on which descriptor_address points to. In the case of the AIT or PMT, it includes only descriptors that follow in the same loop as the hash_descriptor. The pointed descriptors can themselves consist in hash_descriptor fields, which enables a recursive-like computation process.

The syntax of the hash_descriptor is the following:

```
hash_descriptor( ){
    descriptor_tag                          8       uimsbf
    descriptor_length                       8       uimsbf
    digest_count                            16      uimsbf
    for(i=0 ; i<digest_count ; i++){
        digest_type                         8       uimsbf
        descriptor_count                    8       uimsbf
        for(j=0; j< descriptor_count; j++){
            descriptor_address              40      uimsbf
        }
        for (j=0; j< digest_length; j++){
            digest_byte                     8       bslbf
        }
    }
}
``` where "uimsbf" and "bslbf" stand respectively for "unsigned integer most significant bit first" and for "bit string left bit first".

descriptor_tag: labeling of the hash_descriptor.

descriptor_length: length of the hash_descriptor.

digest_count: this 16 bit value identifies the number of digest values in this hash descriptor.

digest_type: this 8 bit value identifies the digest algorithm, if any, used for the associated descriptors. The allowed values are given in Table 1, where MD-5 (MD for "Message Digest") is defined in RFC 1321 (RFC for "Request For Comment"; http://www.ieff.org/rfc/rfc1321.txt) and SHA-1 (SHA for "Secure Hash Algorithm") is defined in FIPS-180-1 (FIPS Publication 180-1: Secure Hash Standard, National Institute of Standards and Technology, 1994; http://www.itl.nist.gov/fipspubs/fip180-1.htm).

TABLE 1

Allowed values for the digest algorithm

| Value | Digest length | Algorithm |
| --- | --- | --- |
| 0 | 0 | Non authenticated |
| 1 | 16 | MD-5 |
| 2 | 20 | SHA-1 |
| Others | | Reserved | descriptor_count: this 16 bit value identifies the number of descriptors associated with the digest value. The value of this field shall be greater than zero.

descriptor_address: this is the generic address of descriptors in sections, which is explained and detailed further on.

digest_length: this integer value gives the number of bytes in each digest value. It depends upon the digest type as indicated in table 1.

digest_byte: this 8 bit value holds one byte of the digest value.

Specification of the Signature_Descriptor

The syntax of that descriptor is as follows:

```
signature_descriptor( ){
    descriptor_tag                  8       uimsbf
    descriptor_length               8       uimsbf
    signature_id                    8       uimsbf
    signature_length                8       uimsbf
    for(i=0; i<N; i++){
        signature specific data
    }
}
``` descriptor_tag: labeling of the signature_descriptor.

descriptor_length: length of the signature_descriptor.

signature_id: this ID (for "IDentifier") enables to have signatures from more than one authority.

signature_length: Indicates the length of the following loop.

The field "signature specific data" contains the following ASN.1 ASN.1 structure (for "Abstract Syntax Notation one" language), being a combination of BER (Basic Encoding Rules) and DER (Distinguished Encoding Rules) structures:

```
Signature ::= SEQUENCE {
    certificateIdentifier       AuthorityKeyIdentifier,
    hashSignatureAlgorithm      HashAlgorithmIdentifier,
    signatureValue              BIT STRING }
``` certificateIdentifier: as defined in the ITU-T X.509 extension (for International Telecommunications Union—Telecommunication Standardization Section, Recommendation X.509: The Directory Authentication Framework, 1997) related to the AuthorityKeyIdentifier field. It identifies the certificate that carries the certified public key that is used to check the signature:

```
AuthorityKeyIdentifier ::= SEQUENCE {
    keyIdentifier               [0] KeyIdentifier OPTIONAL,
    authorityCertIssuer         [1] GeneralNames OPTIONAL,
    authorityCertSerialNumber   [2] CertificateSerialNumber OPTIONAL }
```

Implementations are not required to use a possibly present key identifier element ("keyIdentifier") of the AuthorityKeyIdentifier. The AuthorityKeyIdentifier structure contains both an authority certificate issuer identication (authorityCertIssuer) and corresponding authority certificate serial number elements (authorityCertSerialNumber).

The authoritycertIssuer field contains the field "directoryName", which gives the issuer name of the certificate that carries the public key used to check the signature (and being thus equal to a field issuerName used in MHP).

hashSignatureAlgorithm: this field identifies the used hash algorithm. As concerns the encryption algorithm required to compute the signature, it is already described in the certificate that certifies the associated key (in a SubjectKeyInfo field). Thus, only the identification of the hash algorithm is needed. The supported algorithms are MD5 and SHA-1, of which identifiers are classically given by (see RFC 2379):

md5 OBJECT IDENTIFIER::={iso(1) member-body(2) US(840) rsadsi(113549) digestAlgorithm(2) 5}
sha-1 OBJECT IDENTIFIER::={iso(1) identified-organization(3) oiw(14) secsig(3) algorithm(2) 26} signatureValue: value of the signature, which depends on choice for MHP specification.

Specification of the Certificate_Descriptor:

That descriptor contains several certificates used recursively as in classical PKI techniques. Notably, a leaf certificate is placed first in the certificate_descriptor, and a root certificate, which is included therein for consistency only, is lastly indicated.

A file named CertificateFile contains all of the certificates in the certificate chain mentioned in the certificate_descriptor, up to and including the root certificate. The profile for encoding the certificate is defined in ETSI. TS 102 812 V1.1.1 (for "European Telecommunication Standards Institute, Technical Specification").

The certificate_descriptor is specified as follows:

```
certificate_descriptor( ){
    descriptor_tag                          8    uimsbf
    descriptor_length                       8    uimsbf
    signature_id                            8    uimsbf
    certificate_here_flag                   1    bslbf
    reserved                                7    bslbf
    if(certificate_here_flag == 1){
        certificate_cout                    16   uimsbf
        for(i=0; i<certificate_count; i++){
            certificate_length              24   uimsbf
            certificate( )
        }
    }
}
``` descriptor_tag: labeling of the certificate_descriptor.

descriptor_length: length of the certificate descriptor.

signature_id: this ID links the certifications to a specific signature certificate_here_flag: this is a bit field which, when set to "1", indicates that the certificates are located in this descriptor. Otherwise, the certificates from an application should be used, a link having to be defined.

certificate_count this 16 bit integer carries the number of certificates in the certificate descriptor.

certificate_length: this 24 bit integer specifies the number of bytes in the certificate.

certificate( ): this field carries a single "certificate" data structure as defined by ITU-T X.509.

In the case of an MHP platform, the same certification management as used for interactive applications can be used. Otherwise, mechanisms for certificate management are specifically established.

Generic Addressing of Descriptors in MPEG/DVB Sections (Field "Descriptor_Address" in the Hash_Descriptor)

The addressing mechanism to address descriptors in MPEG and DVB tables is now detailed. A variable length addressing mechanism can be used, which enables to store addresses in a more compact manner. However, in the present embodiments, the addresses have a constant length of 40 bits, which makes processing easier. Looking at current MPEG and DVB specifications, we can identify three different types of sections.

The first section type (hereinafter denoted by "type0") has the below described structure, the PAT, CAT and TOT tables being built with such type0 sections:

```
type0_section( ){
    table_id
    ...
    for (i=0; i<N; i++){
        descriptor( )
    }
    CRC_32
}
``` with table_id giving an identification of the table and CRC standing for "Cyclic Redundancy Check".

In the case of a type0 section, the bytes in the address have the following meaning:

First byte: section number in the table;

Second byte: 0;

Third byte: 0;

Fourth byte: i(N), this byte addresses the descriptor in the type0 section loop.

The second section type (hereinafter denoted by "type1") has the below described structure, the SDT and EIT tables being built with such type1 sections:

```
type1_section( ){
    table_id
    ...
    for(i=0; i<N1; i++){
        ...
        for(j=0; j<N2; j++){
            descriptor( )
        }
    }
    CRC_32
}
```

First byte: section number in the table;

Second byte: 0;

Third byte: i(N1), this byte addresses the outer loop of the type1 section;

Fourth byte: j(N2), this byte addresses the inner loop of the type1 section.

The third section type (hereinafter denoted by "type2") has the below described structure, the NIT, BAT, PMT and AIT tables being built with such type2 sections:

```
type2_section( ){
    table_id
    ...
    for (i=0; i<N1; i++){
        descriptor( )
    }
    ...
    for(j=0; j<N2; j++){
        ...
        for(k=0; k<N3; k++){
            descriptor( )
        }
    }
    CRC_32
}
```

In the case of a type2 section, the descriptor address needs five bytes:

First byte: section number in the table;
Second byte: i(N1), this byte addresses the first loop of the type2 section;
Third byte: j(N2), this byte addresses the outer loop of the second loop of the type2 section;
Fourth byte: k(N3), this byte addresses the inner loop of the second loop of the type2 section.

Top Level Descriptors

By top level descriptors, we understand the certificate_descriptor and the signature_descriptor fields, as well as the hash_descriptor field pointing to all other hash_descriptor fields in the section with the descriptors to be authenticated (namely, the hash_descriptor containing the root digest value).

In the present embodiment, those descriptors are sent in a specific section, which is linked to the section containing the descriptors to be authenticated. This linked specific section contains the same PID and Table_ID as the ones of the original section, but is differentiated from the latter via a special indicator, called "section_syntax_indicator". For all DVB/MPEG defined sections, this section_syntax_indicator is set to one, which means that the section syntax follows the generic section syntax. For the specific extension, the section_syntax_indicator is set to zero, which means that private data are present after a field giving the length of the specific section (private_section_length). Those private data are specified in a way that they can contain the top level information. The extension section has for example the following structure:

```
extension_section( ){
    table_id                    8   uimsbf
    section_syntax_indicator    1   bslbf
    private_indicator           1   bslbf
    reserved                    2   bslbf
    private_section_length     12   uimsbf
    reserved                    3   bslbf
    version_number              5   uimsbf
    certificate_descriptor( )
    signature_descriptor( )
    hash_descriptor( )
}
```

The field private_indicator, specified in ISO/IEC 13818-1 in the definition part of a private section, is a reserved bit for future uses, and the field "version_number" indicates to which version of table the extension section belongs to (see notably EN 300 468 V1.3.1—for "European Norm").

EXAMPLE

The following example shows how the descriptors of an AIT can be used for signing. In this example, that whole table formed of several sections is globally authenticated, instead of each section being separately authenticated as before. The first step is to select the descriptors to be authenticated. The second step is then to calculate hash codes over those descriptors by using the MD5 digest algorithm. A hash_descriptor, which is situated in each loop that contains at least one authenticated descriptor, contains the addresses of these descriptors and the MD5 digest value of these descriptors. Since the hash_descriptor is addressable, it needs not have a specific position in a loop. In this way, hash codes can be generated for the AIT section.

The following figure shows the insertion of the hash_descriptor fields in a usual AIT structure (as defined in ETSI TS 102 812 V1.1.1):

| | Number of bits | Identifier |
|---|---|---|
| Application_information_section( ){ | | |
|     Table_id | 8 | uimsbf |
|     Section_syntax_indicator | 1 | bslbf |
|     Reserved_for_future_use | 1 | bslbf |
|     ... | | |
|     Common_descriptor_length | 12 | uimsbf |
|     for (i=0; i<N1; i++){ | | |
|         // hash_descriptor( ) | | |
|         // other descriptor( ) | | |
|     } | | |
|     ... | | |
|     application_loop_length | 12 | uimsbf |
|     for (i=0; i<N2; i++) { | | |
|         application_identifier( ) | | |
|         application_control_code | 8 | uimsbf |
|         ... | | |
|         application_descriptors_loop_length | 12 | uimsbf |
|         for (j=0; j<N3; j++){ | | |
|             // hash_descriptor( ) | | |
|             // other descriptor( ) | | |
|         } | | |
|     } | | |
|     CRC_32 | 32 | rpchof |
| } | | | where "rpchof" stands for "remainder polynomial coefficients, highest order first".

The complete AIT table can consist of several sections, as any DVB/MPEG table. After the hash codes of all sections of the table have been calculated, the top level information has to be generated. In order to do this, a top level hash_descriptor taking into account all hash_descriptor fields of the corresponding table is computed (root digest value), where the above described descriptor addressing mechanism is used. The next step is to RSA-encrypt (RSA cryptographic algorithm standing for Rivest-Shamir-Adleman) this top level hash_descriptor with a private key, corresponding to the public key that can be found in the leaf certificate of the corresponding certificate_descriptor. The result of this RSA-encryption is the signature that is stored in the signature_descriptor. The three top level descriptors are stored in a so called extension section of the corresponding table. In the case of the AIT, the table ID is always 0x74, but the PID (Packet IDentifier) is the value that is listed in the PMT of the corresponding service. The extension section containing the top level descriptors has the same PID and table ID as those of the AIT to be authenticated, but the section_syntax_indicator is set to zero:

```
extension_section( ){
    table-id (0x74)                       8    uimsbf
    section_syntax_indicator (0x00)       1    bslbf
    private_indicator                     1    bslbf
    reserved                              2    bslbf
    private_section_length               12    uimsbf
    reserved                              3    bslbf
    version_number                        5    uimsbf
    certificate_descriptor( )
    signature_descriptor( )
    hash_descriptor( )
}
```

The version number indicates to which version of table this extension section belongs to.

In a variant embodiment, all hash_descriptor fields are placed at the top level in the extension_section.

In implementations, it is recommended to set the section_syntax_indicator bit as "don't care" (meaning that the demultiplexer dealing with the stream passes the bit through independently of its state "0" or "1"), so that the required DVB/MPEG section itself and the extension_section pass the demultiplexer filter. In this way, the top level descriptors in the extension section are directly available and the authentication can be instantly done.

The invention claimed is:

1. Device for signing digital streams for transmission via a communication network, said device producing at least one signature for incorporation in said digital streams from encrypting applied to said digital streams, each of said digital streams comprising several information entities, said entities including:
    contents, related to at least audiovisual information,
    and at least one signalling, made of an information set related to origins, destinations and structuring of said contents, said signaling being modifiable in networks due to network requirements, said signaling containing essential data structures called descriptors, and being built mainly by means of arranged groupings called tables, wherein said device can includes means for applying encrypting to at least said signaling, and more specifically to selectively determined descriptors among said descriptors of said signaling, called authenticated descriptors, that remain untouched by re-multiplexing steps in the network head-ends.

2. Signing device according to claim 1, wherein said signaling resides in Program Specific Information, Service Information and some private data.

3. Signing device according to claim 1, wherein said digital streams are built according to DVB and MPEG standards.

4. Signing device according to claim 3, wherein said digital streams are built according to MHP standard.

5. Signing device according to claim 1, wherein said encrypting is applied to the authentication of any MPEG/DVB table.

6. Signing device according to claim 5, wherein said device applies said encrypting to the authentication of at least one of the following tables: PMT, PAT, CAT, NIT, SDT, BIT, TOT, AIT and BAT.

7. Signing device according to claim 6, wherein said device applies said encrypting to the authentication of at least one AIT table.

8. Signing device according to claim 1, further comprising means for enabling a user to select said authenticated descriptors.

9. Signing device according to claim 1, wherein said signature is introduced in at least one lowest level signature descriptor in said digital streams and said digital streams incorporate at least one certification descriptor including certification data on said signature and at least one higher level signature descriptor resulting from applying encrypting to both contents of said lowest level signature descriptor and certification descriptor.

10. Signing device according to claim 1, further comprising means for incorporating into said digital streams addresses of said authenticated descriptors.

11. Signing device according to claim 10, wherein said incorporating means introduce at least one hash descriptor in each of said digital streams, said hash descriptor comprising at least one digest value resulting from the application of a hash algorithm to at least one of said authenticated descriptors and being used for computing said signature, and comprising also the addresses of said authenticated descriptors used for computing said digest value.

12. Signing device according to claim 11, wherein said incorporating means arrange said hash descriptors in said digital streams according to a tree structure, at least one of said hash descriptors being computed from at least one other of said hash descriptors having a lower level.

13. Signing device according to claim 10, wherein each table comprising at least one section having a limited size and being allocated a number, and each section comprising at least one loop successively introducing descriptors in said section, said incorporating means are intended to specify the address of each of said authenticated descriptors belonging to at least one given loop of a given section and having at least one occurrence number respectively for each of said loops, by mentioning at least said section number and said occurrence numbers.

14. Signing device according to claim 10, wherein said device introduces said signature, at least one of said digest values and said certification data, in the form of private data into at least one specific section, said specific section being linked to said sections containing said authenticated descriptors.

15. Process for signing digital streams for transmission via a communication network, by producing at least one signature to be incorporated in said digital streams from encrypting applied to said digital streams, each of said digital streams comprising several information entities, said entities including:
    contents, related to at least audiovisual information,
    and at least one signaling, made of an information set related to origins, destinations and structuring of said contents, said signaling being liable to be modified in networks due to network requirements, containing essential data structures called descriptors, and being built mainly by means of arranged groupings called tables,
wherein said process comprises a step of applying said encrypting to said signaling, and more specifically to selectively determined descriptors among said descriptors of said signaling, called authenticated descriptors, that remain untouched by re-multiplexing steps in the network head-ends.

16. Device for authenticating digital streams received via a communication network by checking at least one signature incorporated in said digital streams, each of said digital streams comprising several information entities, said entities including:

contents, related to at least audiovisual information, and at least one signaling, made of an information set related to origins, destinations and structuring of said contents, said signaling being liable to be modified in networks due to network requirements, containing essential data structures called descriptors, and being built mainly by means of arranged groupings called tables, wherein said authentication device includes means for applying authentication to at least said signaling, and more specifically to selectively determined descriptors among said descriptors of said signaling, called authenticated descriptors, from which said signature is computed, the authenticated descriptors remaining untouched by re-multiplexing steps in the network head-ends.

17. The device according to claim 16 wherein the authentication device comprises a decoder.

18. Process for authenticating digital streams received via a communication network by checking at least one signature incorporated in said digital streams, each of said digital streams comprising several information entities, said entities including:

contents, related to at least audiovisual information, and at least one signaling, made of an information set related to origins, destinations and structuring of said contents, said signaling being liable to be modified in networks due to network requirements, containing essential data structures called descriptors, and being built mainly by means of arranged groupings called tables, wherein said authentication process comprises a step of applying authentication to said signaling, and more specifically to selectively determined descriptors among said descriptors of said signaling, called authenticated descriptors, from which said signature is computed, said authentication process being preferably intended to be executed by an authentication device according to claim 16.

* * * * *

UNITED STATES PATENT AND TRADEMARK OFFICE
CERTIFICATE OF CORRECTION

PATENT NO.       : 7,627,762 B2                                           Page 1 of 1
APPLICATION NO.  : 10/514796
DATED            : December 1, 2009
INVENTOR(S)      : Schaefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Second Day of November, 2010

David J. Kappos
*Director of the United States Patent and Trademark Office*